United States Patent
Furukawa et al.

(10) Patent No.: US 7,304,922 B2
(45) Date of Patent: Dec. 4, 2007

(54) METHOD AND APPARATUS FOR PRODUCING A MASTER DISC ON WHICH DIGITAL DATA IS RECORDED IN SYNCHRONISM WITH PRE-RECORDED ADDRESS DATA

(75) Inventors: Shunsuke Furukawa, Tokyo (JP); Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 11/261,841

(22) Filed: Oct. 28, 2005

(65) Prior Publication Data
US 2006/0062138 A1    Mar. 23, 2006

Related U.S. Application Data

(63) Continuation of application No. 09/649,955, filed on Aug. 29, 2000, now Pat. No. 6,985,410.

(30) Foreign Application Priority Data
Aug. 31, 1999    (JP)    ............... P11-246549

(51) Int. Cl.
*G11B 15/52*    (2006.01)

(52) U.S. Cl. .............................. 369/47.15; 369/59.25
(58) Field of Classification Search ............... None
See application file for complete search history.

(56) References Cited

U.S. PATENT DOCUMENTS

| | | | |
|---|---|---|---|
| 5,570,339 | A | 10/1996 | Nagano |
| 5,930,209 | A | 7/1999 | Spitzenberger et al. |
| 6,192,018 | B1 | 2/2001 | Kobayashi et al. |
| 6,351,439 | B1 | 2/2002 | Miwa et al. |
| 6,414,935 | B1 | 7/2002 | Masuhara et al. |
| 6,597,648 | B1 | 7/2003 | Yeo et al. |
| 6,757,483 | B1 | 6/2004 | Sawabe et al. |

FOREIGN PATENT DOCUMENTS

| | | |
|---|---|---|
| EP | 0930615 | 7/1999 |
| WO | WO-9852194 | 11/1998 |
| WO | WO-0068945 | 11/2000 |

*Primary Examiner*—Paul W. Huber
(74) *Attorney, Agent, or Firm*—Lerner, David, Littenberg, Krumholz & Mentlik, LLP

(57) ABSTRACT

A recording medium on which digital data is recorded in synchronism with pre-recorded address data. At least a portion of the address data is converted in accordance with a pre-set conversion rule.

18 Claims, 8 Drawing Sheets

METHOD AND APPARATUS FOR PRODUCING A MASTER DISC ON WHICH DIGITAL DATA IS RECORDED IN SYNCHRONISM WITH PRE-RECORDED ADDRESS DATA

This application is a continuation of application Ser. No. 09/649,955 filed Aug. 29, 2000 now U.S. Pat. No. 6,985,410.

BACKGROUND OF THE INVENTION

1. Field of the Invention

This invention relates to a recording medium, a method and apparatus for preparing a master disc for a recording medium, a method and apparatus for recording a recording medium, a method and apparatus for reproducing a recording medium and a disc-shaped recording medium. More particularly, it relates to a recording medium on which address data have been recorded at the outset, a method and apparatus for preparing a master disc for the recording medium, a method and apparatus for recording the recording medium, a method and apparatus for reproducing the recording medium, and a disc-shaped recording medium.

2. Background of the Invention

As a recording medium having optically recorded thereon digital data, such as high-quality digital video signals, there has widely been known a replay-only DVD (digital versatile disc or a digital video disc). Recently, attempts are being made for commercialization or development of a DVD-R (DVD-Recordable), a DVD-RW (DVD-Rewritable) or a DVD-RAM (DVD-Random Access memory), as a write-once or rewritable recording medium exploiting the DVD format.

In these recording mediums, as in the CD-R (CD-Recordable), CD-RW (CD-Rewritable) or MO (magneto-optical) disc, grooves or pre-pits are recorded sequentially as address data are incremented.

Meanwhile, in the above-described recording medium, a blank disc, on which main data are not recorded as yet, address data are determined definitely. Thus, there has persisted a risk of illicitly copying the contents of the recording medium bit-by-bit or falsifying critical data, such as copyright data, recorded on the specified address data.

SUMMARY OF THE INVENTION

It is therefore an object of the present invention to provide recording medium which resolves the above-mentioned problem.

It is another object of the present invention to provide an apparatus for preparing a master disc for a recording medium which resolves the above-mentioned problem.

It is a further object of the present invention to provide a method for preparing a master disc for a recording medium which resolves the above-mentioned problem.

It is a further object of the present invention to provide a recording apparatus for a recording medium which resolves the above-mentioned problem.

It is still another object of the present invention to provide a recording method for a recording medium which resolves the above-mentioned problem.

It is yet another object of the present invention to provide a reproducing apparatus for a recording medium which resolves the above-mentioned problem.

It is a further object of the present invention to provide a reproducing method for a recording medium which resolves the above-mentioned problem.

It is another object of the present invention to provide a disc-shaped recording medium which resolves the above-mentioned problem.

According to the present invention, there is provided a recording medium on which digital data has been recorded in synchronism with pre-recorded address data wherein at least a portion of the address data has been recorded on conversion on the basis of a pre-set conversion rule.

According to the present invention, there is provided an apparatus for preparing a master disc of a recording medium on which digital data is recorded in synchronism with pre-recorded address data, in which the apparatus includes pre-format signal generating means for generating pre-format signals pre-recorded on the recording medium, the pre-format signals containing the address data, and recording means for recording the pre-format signals from the pre-format signal generating means on the master disc. The pre-format signal generating means converts at least a portion of the address data in accordance with a pre-set conversion rule to generate the pre-format signals.

According to the present invention, there is provided a method for preparing a master disc used for preparing a recording medium on which digital data has been recorded in synchronism with pre-recorded address data, in which the method includes converting at least a portion of the address data based on a pre-set conversion rule, generating pre-format signals for recording on the master disc, the pre-format signals containing the address data and recording the generated pre-format signals on the master disc.

According to the present invention, there is provided an apparatus for recording digital data on a recording medium in synchronism with pre-recorded address data, the apparatus including recording signal generating means for generating recording signals to be recorded on the recording medium. The recording signal generating means detects an area in the recording medium where at least a portion of the address data is recorded on conversion in accordance with a pre-set conversion rule. The recording signal generating means decodes the converted address data pre-recorded in the area to generate the recording signals in accordance with the decoded address data.

According to the present invention, there is provided a method for recording digital data on a recording medium in synchronism with pre-recorded address data, in which the method includes detecting an area of the recording medium where at least a portion of the address data is recorded on conversion in accordance with a pre-set conversion rule, decoding the converted address data pre-recorded in the area, and generating recording signals to be recorded on the recording medium in accordance with decoded address data.

According to the present invention, there is provided a disc-shaped recording medium including a first area in which data is to be recorded, and a second area in which is recorded the information at least including the control information required for reproducing data recorded in the first area, wherein address data are pre-recorded in the first and second areas; at least a portion of the address data of the second area is converted in accordance with a pre-set conversion rule.

DESCRIPTION OF THE PREFERRED EMBODIMENTS

Figure 1:
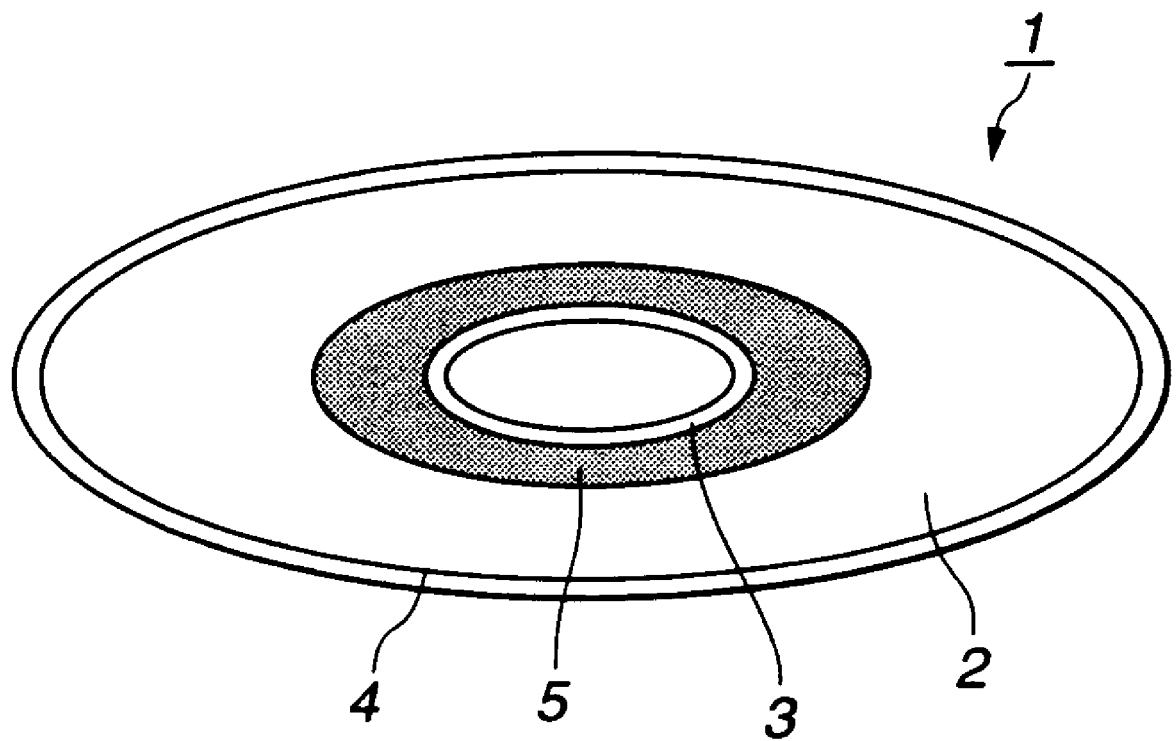
FIG. 1 illustrates a schematic structure of a disc-shaped recording medium according to the present invention.

Referring to the drawings, preferred embodiments according to the present invention will be explained in detail.

The preferred embodiments of the present invention comprise a disc-shaped recording medium, which is an unrecorded or blank disc, such as DVD-R (DVD-Recordable), DVD-RW (DVD-Rewritable) or DVD-RAM (DVD-Random Access memory) for writing only once or overwriting, as a recording medium employing the so-called DVD (digital versatile disc or a digital video disc) format, or CD-R (CD-Recordable) or CD-RW (CD-Rewritable), as a recording medium employing the CD (Compact Disc), a mastering device as an apparatus for preparing master discs of these recording mediums, and a recording apparatus for recording data on these disc-shaped recording mediums.

A disc-shaped recording medium 1, shown in FIG. 1, includes a recording area 2 for main data, a so-called lead-in area 3, arranged on the inner rim side, and a so-called lead-out area 4, arranged on the outer rim side. An area 5 is an optional area on the disc-shaped recording medium 1 including, for example, a beginning portion of the recording area 2 towards the inner rim side. It is unnecessary for the area 5 to include the lead-in area 3 or the lead-out area 4. In this area 5, there are recorded the control information indispensable for reproducing data recorded in the recording area 2, copyright information and the information for decoding encrypted data. In addition, the discriminating information indicating the presence of the area 5 is recorded in e.g., the lead-in area 3 of the disc-shaped recording medium 1.

Figure 2:
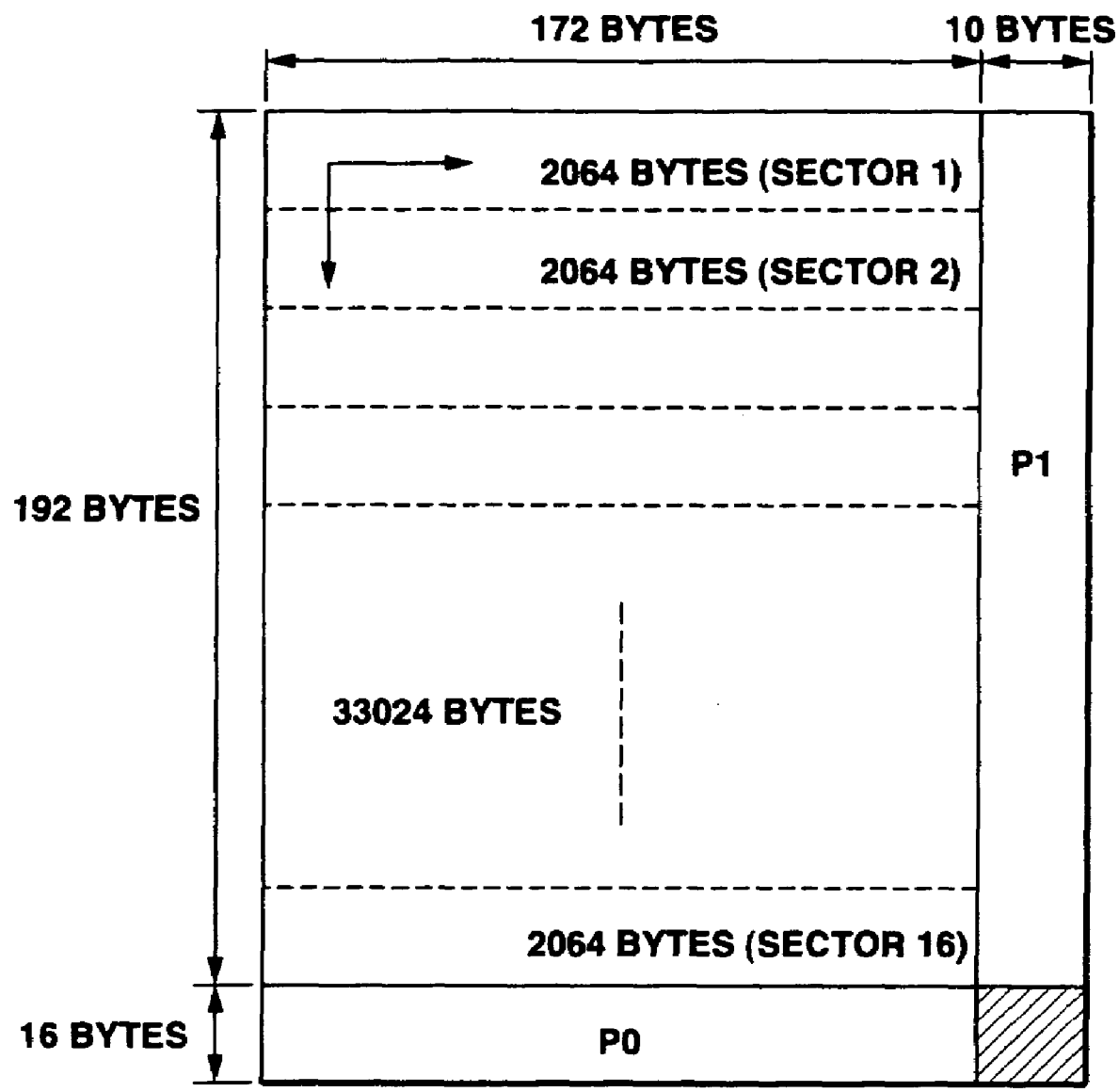
FIG. 2 illustrates the block structure of data in the DVD format.
Figure 3:
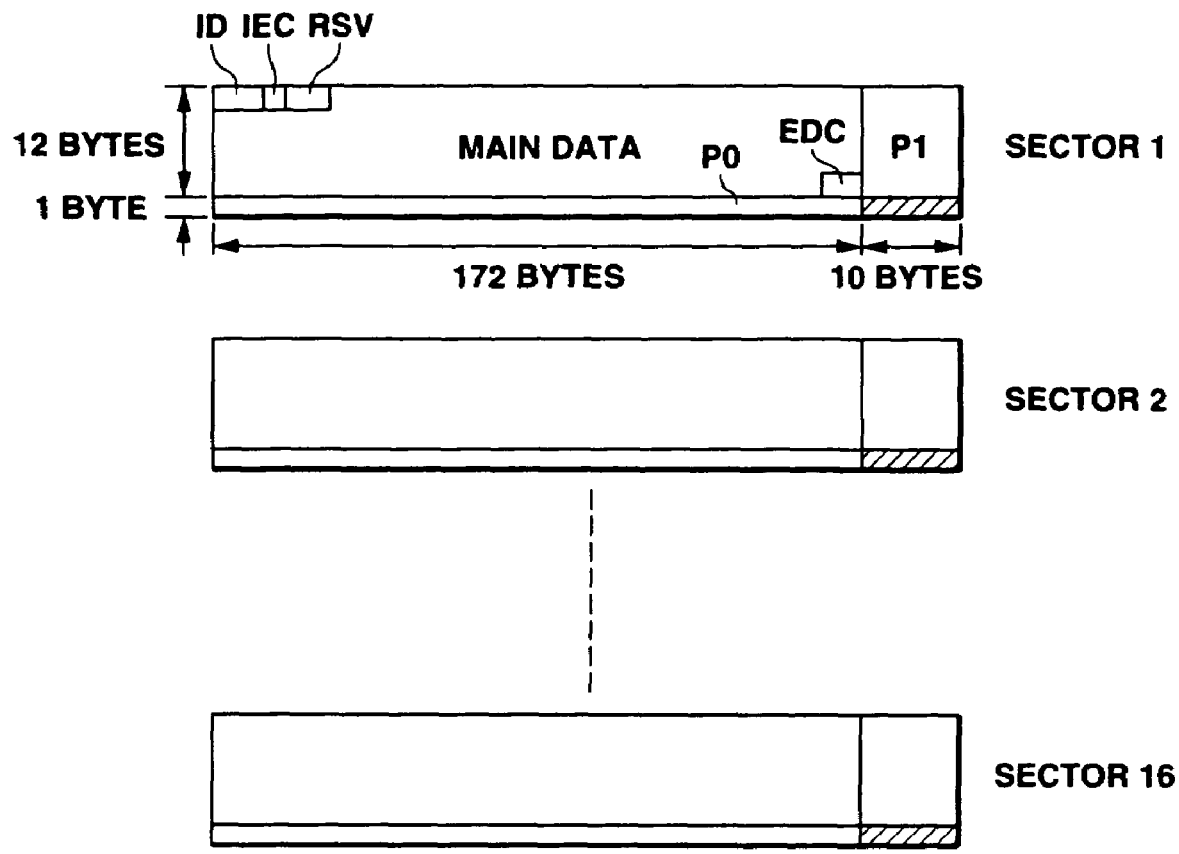
FIG. 3 illustrates a sector structure in recording.

The block structure of data in the DVD format is hereinafter explained. The data block structure in the DVD format is of a so-called product code structure in which two error correction codes, namely PI in the row direction and PO in the column direction, are added to 2064×16 sectors=33024 byte data, as shown for example in FIG. 2. The PI is a (182, 172, 11) Reed-Solomon code and PO is a (208, 192, 17) reed-Solomon code. In the DVD, the PO codes in the block so formed are divided on the byte basis to each sector to provide 16 recording sectors, as shown in FIG. 3.

Each recording sector is made up of a 4-byte ID, in a portion of which a sector address is recorded, a 2-byte IEC, as an ID error check code, a 6-byte RSV, as the control information, 2048 byte main data, 4-byte EDC, as the error check code, a 120-byte EDC and a 182-byte PO. Of the 182-byte PO, 10 bytes, shown shaded in FIG. 3, may also be used as the PI.

In the DVD, these data are 8-16 demodulated and synchronization signals are appended to the modulated data. The resulting data is recorded as pits in a disc-shaped recording medium.

Figure 4:
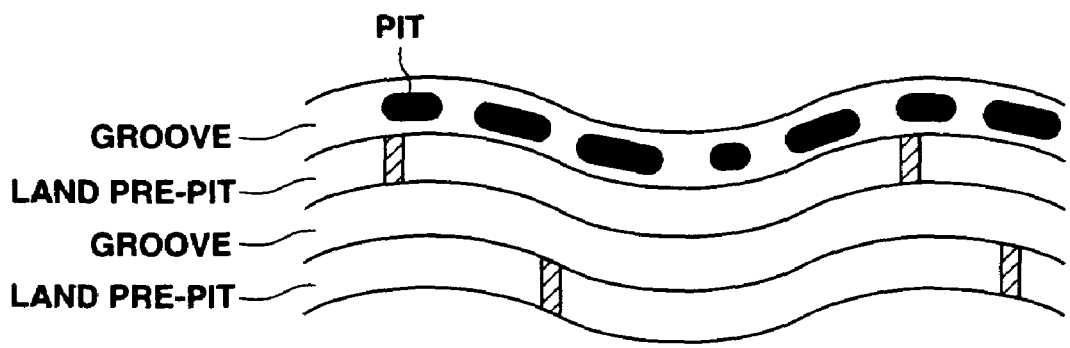
FIG. 4 illustrates the physical structure of a disc-shaped recording medium in the DVD-R and DVD-RW.
Figure 5:
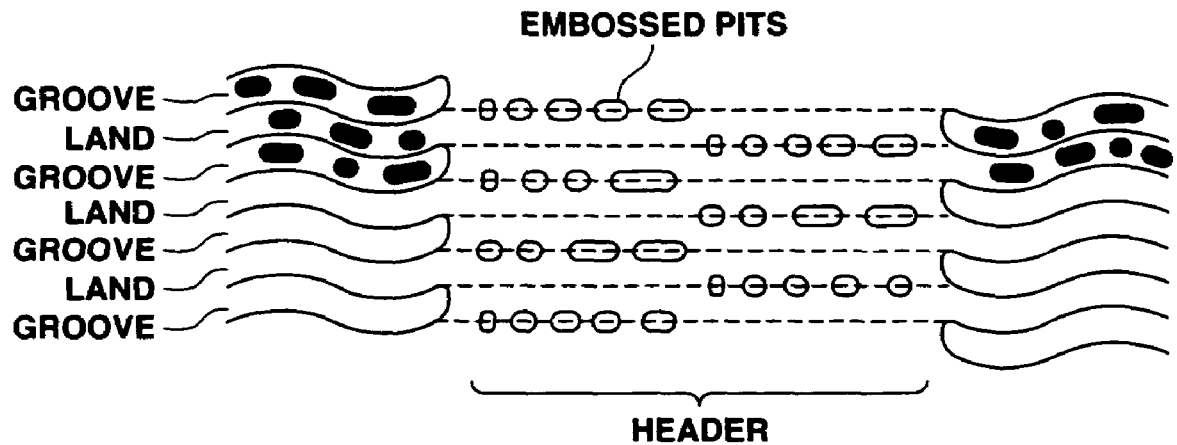
FIG. 5 illustrates the physical structure of a disc-shaped recording medium in the DVD-RAM.

In the above-described DVD-R, DVD-RW and DVD-RAM, data is recorded on the disc-shaped recording medium by thermal recording employing an organic dye material or by phase changes between the crystalline phase and the amorphous phase employing a phase-change recording material, basically in accordance with the DVD format. The physical structure of the disc-shaped recording medium in the DVD-R and DVD-RW is such that plural grooves wobbled at a period of approximately 140 kHz in a radial direction of the disc-shaped recording medium and land pre-pits (LPP) comprising address data as pre-pits are arranged alternately in the radial direction of the disc-shaped recording medium, as shown in FIG. 4. In the grooves, data are recorded as pits. On the other hand, the physical structure of the disc-shaped recording medium in the DVD-RAM is such that plural grooves wobbled at a period of approximately 160 kHz in a radial direction of the disc-shaped recording medium and lands are alternately arranged in the radial direction of the disc-shaped recording medium with intermission, as shown in FIG. 5. There is provided a header in a mirror portion between the grooves and the lands. In the header are recorded addresses as embossed pits. In the grooves and lands, data are recorded as changes between the crystalline phase and the amorphous phase.

The physical structure of the disc-shaped recording medium in the CD-R and CD-RW is such that plural pre-grooves wobbled at a period of approximately 22 kHz in a radial direction of the disc-shaped recording medium and lands are arranged alternately in the radial direction of the disc-shaped recording medium, as shown in FIG. 5. Address data are recorded in the pre-grooves themselves as frequency modulated ATIP (absolute time in pre-groove). In the pre-grooves, data are recorded as pits or as changes between the crystalline phase and the amorphous phase.

In these disc-shaped recording mediums, 20 to 64 bit address data are sequentially recorded in a pre-set sequence. Meanwhile, in the above-mentioned disc-shaped recording mediums, not all address data are recorded in the serial sequence. Specifically, track numbers and sector numbers may be separated from one another, or the address data may be separated into minute, second or frame numbers. However, the address data may be deemed to be incremented in accordance with a pre-set rule.

Figure 6:
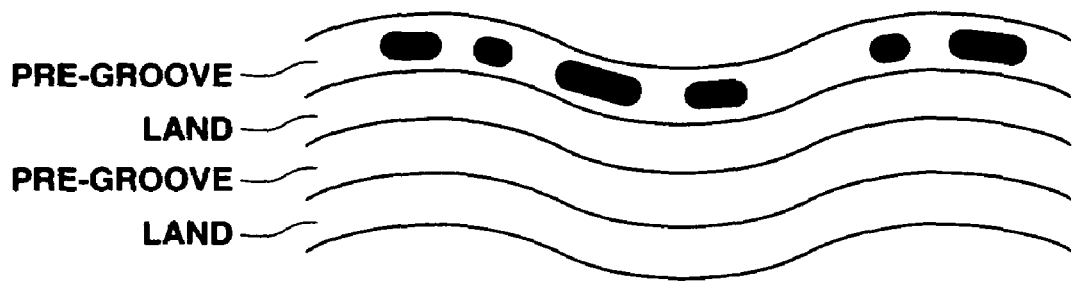
FIG. 6 illustrates the physical structure of a disc-shaped recording medium in the CD-R and CD-RW.

In the following, the address data previously recorded in the pre-pits, emboss marks or pre-grooves of the disc-shaped recording medium, that is recorded in pre-formatting, and address data of data, such as sector addresses or block addresses, as shown in FIGS. 4 through 6, are termed pre-address data and post address data, respectively, in order to distinguish these two sorts of the address data.

In the above-described disc-shaped recording medium 1, pre-address data, to be recorded in a pre-set sequence in an ordinary case by a mastering device, as later explained, are recorded at least in a pre-set area, such as area 5, after conversion in accordance with a pre-set conversion rule. That is, in the disc-shaped recording medium, the pre-address data in the area 5 is converted in accordance with a pre-set conversion rule and recorded after this conversion, instead of being sequentially recorded in the grooves or pre-pits in an incrementing order.

For example, if the sectors 128 (0000000010000000) to 32767 (0111111111111111) represent the area 5, the pre-set conversion rule may be defined by the following methods:

As the first method, the sector addresses, which should be sequentially recorded in an incrementing order of 128, 129, 130, . . . , 32766, 32767, are recorded in a decrementing order. That is, in the disc-shaped recording medium 1, the sector addresses of the area 5 are sequentially recorded in a decrementing order of 32767, 32766, . . . , 130, 129, 128.

As the second method, applied to a case in which the entire sector addresses are represented by the 15-bit information, such as 128, 129, 130, . . . , 32766, 32767, the entire 16-bit information is not converted, but the information corresponding to the lower 15 bits is rewritten by an optional method. If the lower 15-bit information is not rewritten unexceptionally, but the entire address data to be converted are represented by an optional number of bits less than 16 bits, it is possible to rewrite only the information corresponding to the number of bits. On the disc-shaped recording medium 1, the information respectively rewritten from sector addresses 128, 129, 130, . . . , 32766, 32767 is recorded in the area 5.

As a third method, 16-bit M series are generated and added to the sector addresses 128, 129, 130, . . . , 32766, 32767. A generating polynominal of this 16-bit M-series is represented by, for example, $$g(x)=x^{16}+x^{12}+x^5+1.$$

In the disc-shaped recording medium 1, the first data of the M-series is a secret key for decoding the converted addresses. In the disc-shaped recording medium 1, the information converted respectively from sector addresses 128, 129, 130, . . . , 32766, 32767 are recorded in the area 5.

As a fourth method, the sector addresses 128, 129, 130, . . . , 32766, 32767 are encrypted by, for example, DES (data encryption standard). In the DES, 56-bit data are used as an encryption key. In the disc-shaped recording medium 1, a pre-set bit string is added to each of the sector addresses 128, 129, 130, . . . , 32766, 32767 to generate a key. The information converted from the sector addresses 128, 129, 130, . . . , 32766, 32767 is recorded in the area 5 of the disc-shaped recording medium 1.

Meanwhile, in the disc-shaped recording medium 1, an encryption key may be recorded in a pre-set area for address data of the disc-shaped recording medium 1, such as in a sector 127. If data including main data is recorded in the pre-set area by a data recording apparatus, as later explained, an encryption key may also be recorded in the data sector. Moreover, a code of a producer of the disc-shaped recording medium or an ID of the disc-shaped recording medium 1 may be substituted for part or all of the encryption key.

Figure 7:
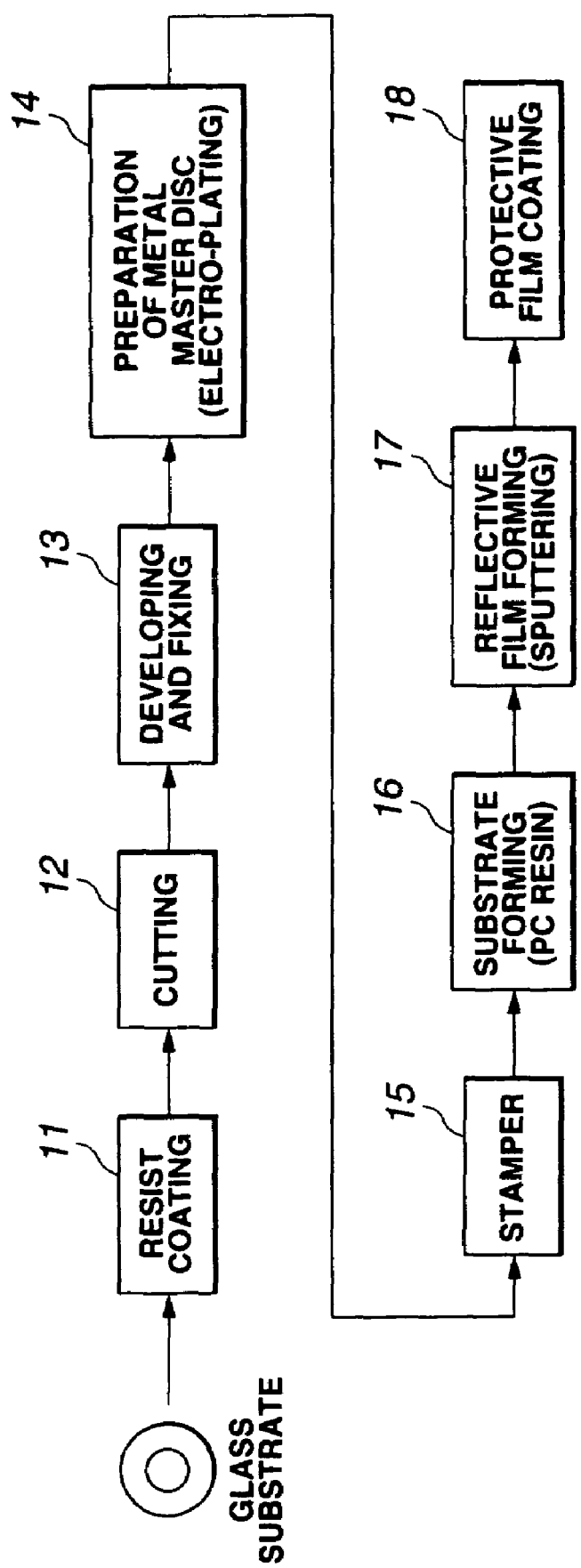
FIG. 7 illustrates the sequence of manufacturing a disc-shaped recording medium shown in FIG. 1.

This disc-shaped recording medium 1 is manufactured by a sequence shown in FIG. 7. That is, a photoresist, as a photosensitive material, is coated on a glass substrate in a resist coating step 11. In a cutting step, laser cutting is performed on the glass substrate, coated with the photoresist, using a light beam modulated based on data to be pre-formatted. In this laser cutting step S12, a light beam is illuminated on the photoresist of the glass substrate, to effect pre-formatting, depending on the sort of the disc-shaped recording medium 1, as shown in FIGS. 4 through 6. At this time, pre-address data are recorded and formed on the photoresist of the glass substrate. Then, laser cutting of the photoresist on the glass substrate is performed in accordance with pre-format signals for recording pre-address data converted in accordance with the above-described pre-set conversion rule. In a developing/fixing step 13, the laser-cut photoresist of the glass substrate is developed and fixed. In a metal master disc producing step 14, the surface of the photoresist is electro-plated to produce a metal master disc. The above-described sequence of operations is performed by a mastering device as later explained to prepare a master disc, that is a master of the disc-shaped recording medium 1.

Then, in a stamper step 15 and in a substrate forming step 16, a stamper is prepared, using the stamper. The produced stamper is mounted on an injection molding device where a substrate is produced by injection molding using an optically transparent resin, such as polycarbonate (PC) or acrylic resin. In a reflective film forming step 17, a reflective film is formed by sputtering on one of the major surfaces of the molded transparent resin. For this sputtering, a target formed of a material usable for forming a special recordable reflective film is used. For example, such a material is used which is mainly formed of Ar or Al, has a reflectance of the same order of magnitude as that of the routine CD or DVD or a reflectance that permits readout with a routine optical head and that is capable of forming a special reflective film which causes the reflectance to be changed by illuminating the laser of a power higher than that of the laser used in reproduction on the so-formed special reflective film. In a protective film coating step S18, a UV light curable resin is coated on the reflective film and UV light is illuminated on the UV light curable resin to form a protective film.

Thus, in the disc-shaped recording medium 1, a master disc is prepared by a mastering device and used to prepare a stamper to manufacture a blank disc. The mastering device is hereinafter explained.

Figure 8:
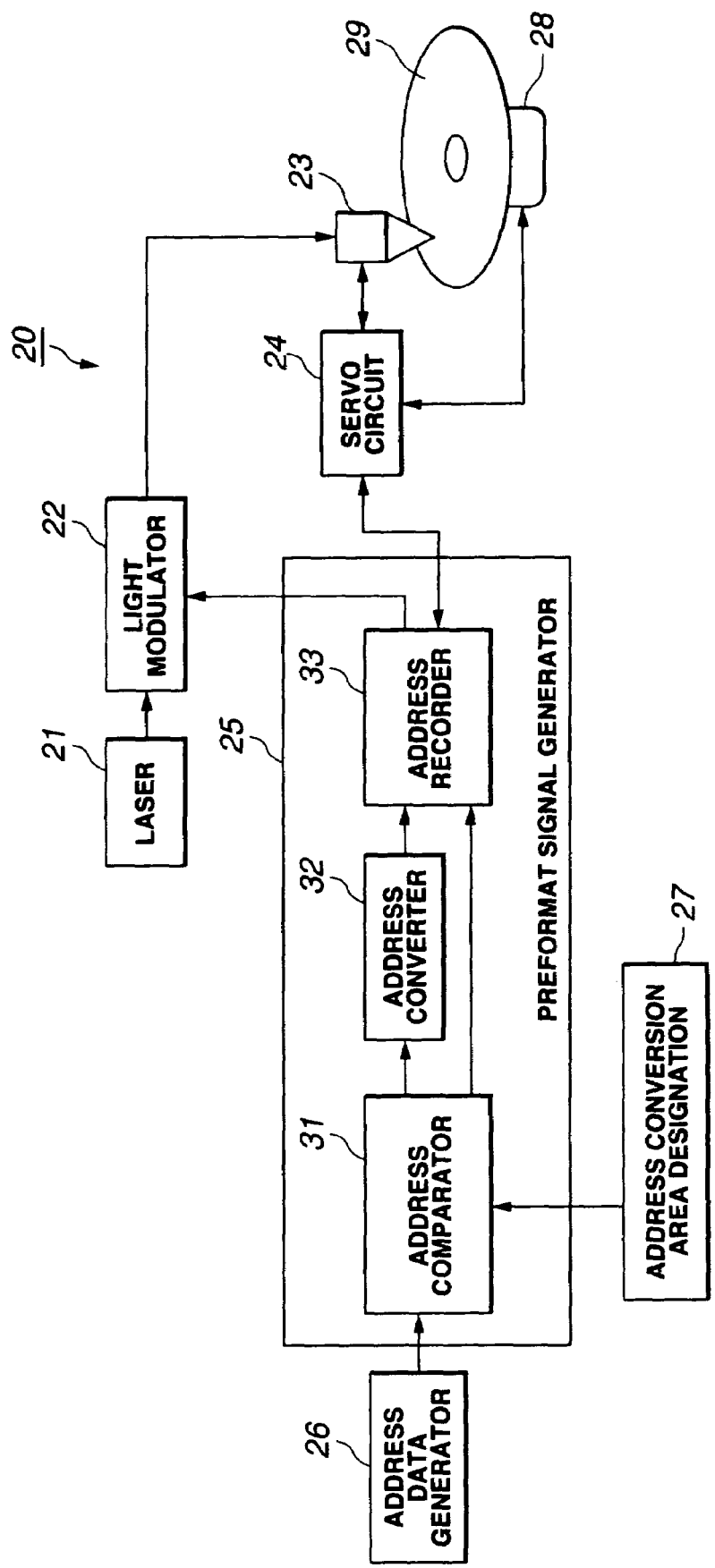
FIG. 8 is a block diagram for illustrating the structure of a mastering device according to the present invention.

Referring to FIG. 8, a mastering device 20, given only by way of an example, includes a light source 21, for example, a gas laser, e.g., an Ar ion laser, a He—Cd laser or a Kr ion laser, a light modulator 22 for modulating (on/off controlling) the laser light radiated from the recording light source 41, based on a signal from a pre-format signal generator 25, as later explained, an optical pickup 23 having an objective lens, a mirror etc for converging the laser light transmitted through the light modulator 22 for illuminating the laser light on a photoresist surface of the glass substrate 29 coated with the photoresist, and a servo circuit 24 for focussing the optical pickup 23 for maintaining a constant distance between the optical pickup 23 and a substrate 29 and for controlling the rotational driving operation of a spindle motor 28, as later explained. The mastering device 20 also includes the pre-format signal generator 25 for generating pre-format signals recorded on the substrate 29, based on address data from an address data generator 26 and on an area specified by an address conversion area specifying unit 27, as later explained, for turning the light modulator 22 on and off, the address data generator 26 for generating address data, and the address conversion area specifying unit 27 for converting a pre-address, that is the above-mentioned area 5. The mastering device 20 also includes a spindle motor 28 for rotationally driving the substrate 29.

Meanwhile, this mastering device 20 is used mainly in the above-mentioned cutting step 12. Finally, a master of the disc-shaped recording medium 1 is to be prepared. Other components required in the remaining steps are not shown here.

In the mastering device 20, the laser light from the light source 21 is modulated by the light modulator 22 in accordance with preformat signals generated by the pre-format signal generator 25. The light modulator 22 includes an EOM (electro-optical modulator), the refractive index of which is changed with the applied electrical voltage, and an EOD (electro-optical deflector) for changing the polarization by the applied voltage. As the light modulator 22, an AOM (acousto-optical modulator) or an AOD (acousto-optical deflector) for generating ultrasonic wave (compressional wave) in a medium by a piezoelectric element. The mastering device 20 illuminates the modulated laser light through the optical pickup 23 on a substrate 29 rotationally driven at e.g., a CLV or CAV, by the spindle motor 28, to effect pre-formatting, depending pn the type of the disc-shaped recording medium 1, as described above, to record pre-address data, as shown in FIGS. 4 through 6, The pre-format signals, recorded by this mastering device 20 on the substrate 29, are generated by the pre-format signal generator 25. The pre-format signal generator 25 includes an address comparator 31 for comparing address data generated by the address data generator 26 to the area specified by the address conversion area specifying unit 27, an address converter 32 for converting the pre-address by e.g., the above-described method, and an address recorder 33 for controlling the light modulator 22 and the servo circuit 24 for recording the pre-address on the substrate 29.

The pre-format signal generator 25 is fed with address data generated by the address data generator 26 and with the information specifying the area specified by the master producer through the address conversion area specifying unit 27. The input information is recorded as preformat signals in some area on the substrate 29. It is assumed here that the address data generator 26 sequentially generates address data in an incrementing fashion to output the generated address data to the pre-format signal generator 25. The pre-format signal generator 25 compares the input address data to the specified area by the address comparator 31 to verify whether or not the input address data is the address data contained in the specified area, that is in the above-mentioned area 5. For example, if the area 5 is provided on the inner rim side of the recording area 2, as shown in FIG. 1, it is verified whether the address data is smaller than the address data specifying the start position of the recording area 2. Alternatively, the address data is compared to the address data specifying the area 5 stored in the memory in the pre-format signal generator 25 to verify whether or not the address data is contained in the area 5.

If the input address data is not contained in the specified area, the pre-format signal generator 25 directly sends the input address data to the address recorder 33.

On the other hand, if the input address data is contained in the specified area, the pre-format signal generator 25 converts the input address data, by the attitude and/or position prediction unit 32, in accordance with the above-described pre-set conversion rule. The pre-format signal generator 25 sends the converted pre-address information to the address recorder 33.

The pre-format signal generator 25 generates preformat signals, derived from converted or non-converted pre-address data, by the address recorder 33, to control the light modulator 22 or the servo circuit 24.

By so doing, the mastering device 20 records the converted or non-converted pre-address data at pre-set positions, as the mastering device 20 forms the grooves or lands, depending on the sort of the disc-shaped recording medium 1, on the substrate 29, to prepare a master of the disc-shaped recording medium 1, as shown in FIGS. 4 through 6.

Figure 9:
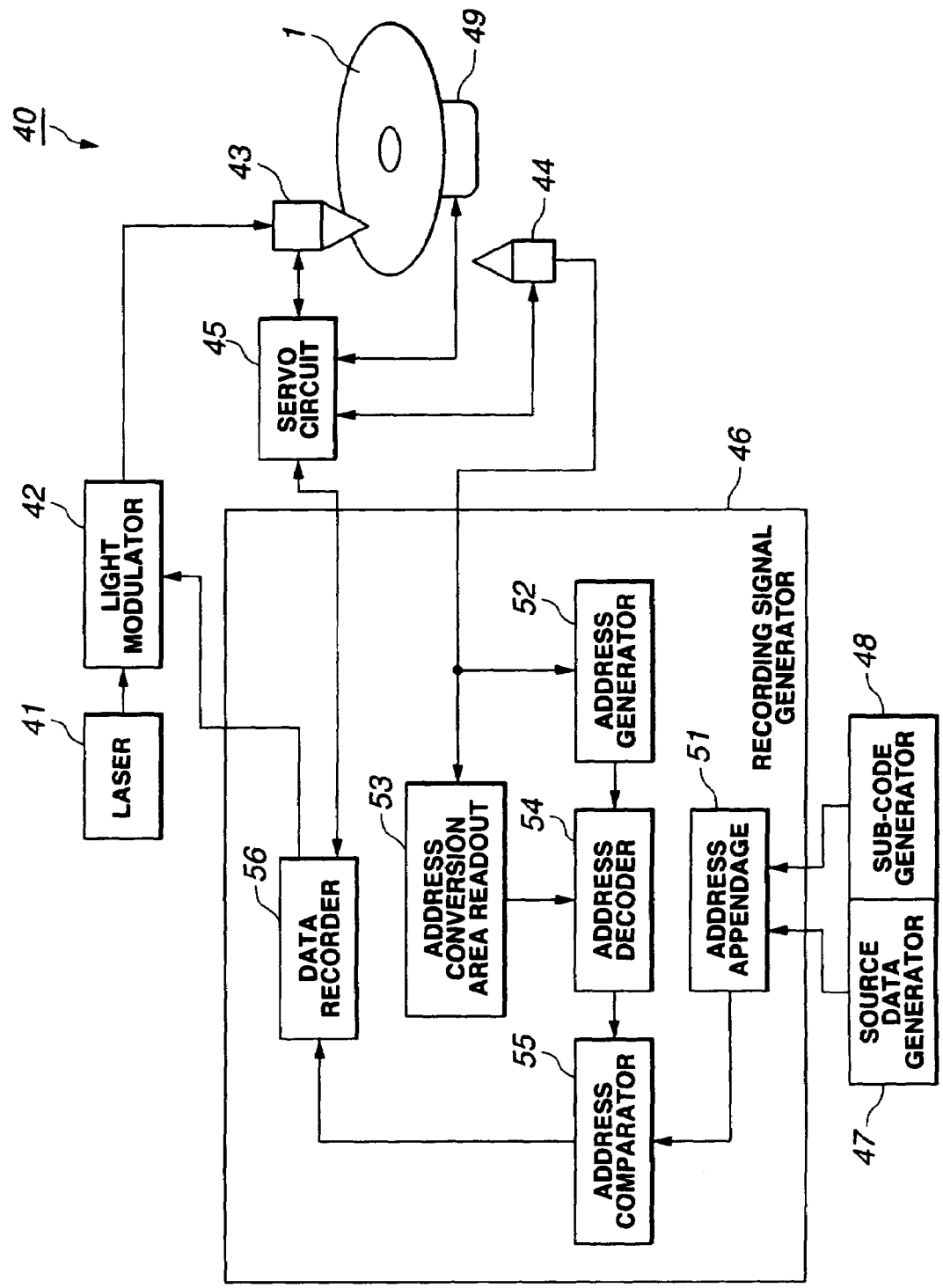
FIG. 9 is a block diagram for illustrating the structure of a data recording apparatus according to the present invention.

On the disc-shaped recording medium 1, which is a blank disc manufactured on the basis of the steps shown in FIG. 7, based on the so-produced master, the control information indispensable for data reproduction, copyright information, and source data, such as digital video signals or digital audio signals, including the information for decoding the encrypted data, can be recorded by a data recording apparatus 40 shown in FIG. 9.

The data recording apparatus 40, shown in FIG. 9, includes a recording light source 41, as a gas laser, such as an Ar ion laser, a He—Cd laser or a Kr ion laser, or a semiconductor laser, a light modulator 42 for modulating (on/off controlling) the laser light radiated by the recording light source 41, based on a signal from a pre-format signal generator 45, as later explained, and an optical pickup 43 having an objective lens, a mirror etc for converging the laser light transmitted through the light modulator 42 for illuminating the laser light on the disc-shaped recording medium 1.

The data recording apparatus 40 also includes an optical pickup 44 for reproduction having an optical system for illuminating the laser light from the reproducing light source, not shown, which is, for example, a gas laser, such as a He—Ne laser, or a semiconductor laser, on the disc-shaped recording medium 1, a servo circuit 45 for focussing the recording optical pickup 43 and the reproducing optical pickup 44 for maintaining a constant distance from the disc-shaped recording medium 1 and for controlling the rotational driving operation of a spindle motor 49 as later explained and a recording signal generator 46 for generating a recording signal for recording on the disc-shaped recording medium 1 based on the source data from a source data generator 47 as later explained and on sub-code data from a sub-code generator 47 as later explained and for turning the light modulator 42 on and off. The mastering device 20 also includes the source data generator 47 for generating the source data, a sub-code generator 48 for generating so-called sub-code data and the spindle motor 49 for rotationally driving the disc-shaped recording medium 1. The data recording apparatus 40, shown in FIG. 9, includes the recording optical pickup 43 and the reproducing optical pickup 44 facing each other with the recording medium 1 in-between. However, the recording optical pickup 43 and the reproducing optical pickup 44 may be arranged on one side of the recording medium 1. Alternatively, a sole optical pickup may be used to record data or read out address data. In the latter case, the output level of the light source of the sole optical pickup is switched between that for data recording and that for readout of address data.

The data recording apparatus 40 detects conversion of pre-address data recorded on the disc-shaped recording medium, based on the pre-address data read out through the reproducing optical pickup 44 by the recording signal generator 46, to generate recording signals. Based on the generated recording signals, the data recording apparatus 40 modulates the laser light from the recording light source 41 by the light modulator 42. Similarly to the light modulator 22 in the mastering device 20, the light modulator 42 has an EOM and an EOD, or an AOM and an AOD. The data recording apparatus 40 illuminates the laser light, modulated by the light modulator 42, on the disc-shaped recording medium 1, run in rotation by the spindle motor 49 at e.g., a CLV or CAV, from the recording optical pickup 43, to record e.g., digital video signals or digital audio signals on the disc-shaped recording medium 1.

The recording signals, recorded by this data recording apparatus 40 on the disc-shaped recording medium 1, are generated by a recording signal generator 46. The recording signal generator 46 includes an address appending unit 51 for combining source data generated by the source data generator 47 and the sub-code data, inclusive of post address data, generated by the sub-code generator 48, to generate data having the post address data, appended thereto, and an address generator 52 for reproducing address data from the signals read out via the reproducing optical pickup 44. The recording signal generator 46 also includes an address conversion area readout unit 53 for detecting and reading out the area where pre-address data have been converted, that is the above-mentioned area 5, based on the aforementioned conversion rule, from the signals read out through the reproducing optical pickup 44, and an address decoding unit 54 for decoding the information of the pre-address data reproduced by the address generator 52. The recording signal generator 46 also includes an address comparator 55 for comparing the post address data appended to the data supplied from the address appending unit 51 to the pre-address data decoded by the address decoding unit 54, and a data recording unit 56 for controlling the light modulator 42 and the servo circuit 45 for recording data on the disc-shaped recording medium 1.

The recording signal generator 46 is fed with source data generated by the source data generator 47 and with sub-code data inclusive of the post-address data generated by the sub-code generator 48 to generate data having the post address data appended thereto by the address appending unit 51. The recording signal generator 46 is also fed with a signal read out from the disc-shaped recording medium 1 by the reproducing optical pickup 44 moved to a position above the disc-shaped recording medium 1 in register with the appended post-address data to reproduce pre-address data from the read-out signals by the address generator 52 to send the reproduced data to the address decoding unit 54. In addition, the recording signal generator 46 detects and reads out, from the signal read out by the address conversion area readout unit 53, whether or not the area in which the reproducing optical pickup 44 is located is within the above-mentioned area 5. The recording signal generator 46 then sends a signal indicating the result to the address decoding unit 54.

The recording signal generator 46 then routes the data, generated on appendage of the post-address data by the address appending unit 51, to the address comparator 55. The recording signal generator 46 also decodes the pre-address data, reproduced by the address generator 52, by the address decoding unit 54, The address decoding unit 54 effects decoding based on the signal from the address conversion area readout unit 53. That is, if the pre-address data supplied from the address generator 52, is outside the area 5, the address decoding unit 54 effects routine decoding. If conversely the pre-address data supplied from the address generator 52 is outside the area 5, this pre-address data has been converted based on the aforementioned conversion rule. So, the address decoding unit 54 effects decoding in accordance with the above-mentioned conversion rule. The address decoding unit 54 routes the pre-address data, obtained on decoding, to the address comparator 55.

The recording signal generator 46 then compares, by the address comparator 55, the post-address data, appended to the data supplied from the address appending unit 51, to the pre-address data appended to the data supplied from the address appending unit 51, to verify whether or not the two address data are associated with each other.

If the two address data are not associated with each other, the recording signal generator 46 compares the post-address data to the pre-address data, reproduced and decoded from the signals read out from a different position on the disc-shaped recording medium 1 by the reproducing optical pickup 44, with the aid of the address comparator 55.

If the two address data are associated with each other, the recording signal generator 46 sends data supplied from the address appending unit 51 to the data recording unit 56, by which recording signals are generated to control the light modulator 42 and the servo circuit 45.

By so doing, the data recording apparatus 40 is able to record source data at a pre-set position on the disc-shaped recording medium 1 through the recording optical pickup 43.

In this manner, the data recording apparatus 40 is aware of the data conversion rule in the disc-shaped recording medium 1 so that source data can be recorded on the disc-shaped recording medium 1 based on the conversion rule for the pre-address data. So, any illicit data recording apparatus unaware of the pre-address data conversion rule or any illicit data recording apparatus attempting to record data regardless of the pre-address data conversion rule has to discontinue data recording because the pre-address data is not the pre-set incremented pre-address data and hence an address data error persists. That is, only the authorized data recording apparatus 40 aware of the pre-address data conversion rule is able to record data.

Figure 10A:
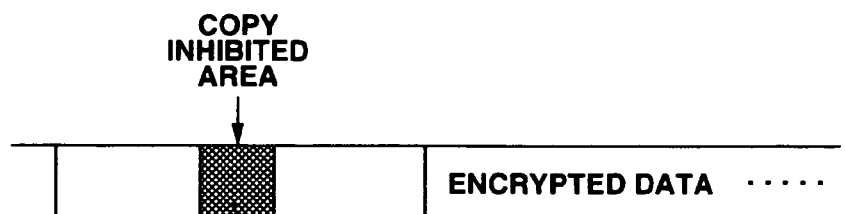
FIGS. 10A and 10B illustrate illicit copying in which the data recording start position is offset to effect recording, FIG. 10A showing a recording track for an original disc-shaped recording medium and FIG. 10B showing a recording track for a disc-shaped recording medium onto which data is to be copied.
Figure 10B:
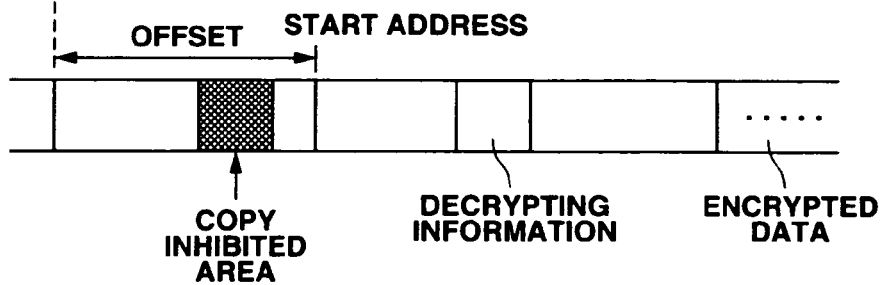

In recording data on the disc-shaped recording medium 1, the post address data, recorded in synchronism with the pre-addresses, are sequentially inputted to the data recording apparatus in an incrementing fashion, and are compared to the converted pre-address data, so that any unauthorized data recording apparatus, attempting to record data by offsetting the data recording start position, is unable to record data on the disc-shaped recording medium 1, as shown in FIGS. 10A and 10B.

Assume that data recorded on a recording track of a marketed routine original disc-shaped recording medium, such as a replay-only DVD, is to be copied on a recording track of a different type of the disc-shaped recording medium, such as DVD-R, DVD-RW or DVD-RAM. Moreover, assume that data are recorded in an encrypted form on the original disc-shaped recording medium and that the information for decryption is recorded in a copy inhibited area. In such case, an unauthorized data recording apparatus is able to perform illicit copying by providing a data recording start position, that is a start address, in an area downstream of the area in which to record the information for decryption, to give an offset to the address data, such as to evade the copy inhibited area.

However, since the pre-address data is converted in the disc-shaped recording medium 1, it is possible for simple address data offsetting to result in failure in copying even if an unauthorized data recording apparatus attempts to copy data by evading the copy inhibited area.

Since the pre-address data is converted in the above-described disc-shaped recording medium 1, embodying the present invention, an address data error occurs when it is attempted to record original data by an unauthorized data recording apparatus, thus preventing illicit data copying or illicit data modification.

The disc-shaped recording medium 1 can be manufactured by the mastering device 20 embodying the present invention. The mastering device 20 is able to convert pre-address data based on the pre-set conversion rule to record the converted pre-address data on the disc-shaped recording medium 1.

In addition, data can be recorded on the disc-shaped recording medium 1 by the data recording apparatus 40 embodying the present invention. The data recording apparatus 40 is aware of the conversion rule for the pre-address data recorded on the disc-shaped recording medium 1 and hence is able to decode the pre-address data in accordance with the conversion rule for the pre-address data to record data furnished with the post address data in synchronism with the pre-address data on the disc-shaped recording medium.

The present invention is not limited to the above-described embodiment. Although the foregoing description has been made on a recordable optical disc, on which no data has been recorded, such as DVD-R, DVD-RW, DVD-RAM, CD-R or CR-RW, as the disc-shaped recording medium 1, the present invention may be applied to other types of the recording medium without limitation as to the disc type.

The present invention also is not limited to the above-mentioned first to four methods as the pre-set conversion rule. Although the conversion is made on the sector address basis, it may be made on the block address basis.

The above-mentioned area 5 may encompass the entire area of the disc-shaped recording medium 1, without being limited to only its partial area. Thus, it is possible to have a portion of the lead-in area 3 designed as routine pre-addresses and to convert the pre-addresses of the remaining area as described above. It is also possible to convert pre-addresses only for areas for recording the crucial information, such as the control information indispensable for data reproduction, copyright information, information for decrypting the encrypted data or start address information. That is, the present invention can be modified within the purport of the invention as defined in the appended claims.

What is claimed is:

1. An apparatus for preparing a master disc of a recording medium on which digital data is recorded in synchronism with pre-recorded address data, said apparatus comprising:
    address generating means for generating said address data;
    address conversion area designating means for designating an address data conversion area in accordance with a pre-set conversion rule;
    pre-format signal generating means for generating pre-format signals pre-recorded on said recording medium, said pre-format signals containing said address data; and
    recording means for recording information specifying an area specified by said address conversion area designating means as said pre-format signals from said pre-format signal generating means on the master disc;
    wherein said pre-format signal generating means converts at least a portion of said address data in accordance with the pre-set conversion rule to generate said pre-format signals;
    wherein said pre-format signal generating means includes:
        address comparator means for comparing address data generated by said address generating means with address data of an area specified by said address conversion area designating means; and
        address conversion means for converting the address data generated by said address generating means, in accordance with said pre-set conversion rule, based on results of a comparison by said address comparator means;
    wherein when, as a result of the comparison by said address comparator means, the address data generated by said address generating means is verified to be contained in the area specified by said address conversion area designating means, said address conversion means converts the address data generated by said address generating means in accordance with said pre-set conversion rule.

2. The apparatus for preparing a master disc according to claim 1 wherein said pre-set conversion rule is to record said address data in a decrementing order.

3. The apparatus for preparing a master disc according to claim 1 wherein said pre-set conversion rule is that, when all said address data to be converted among the pre-recorded address data is expressed with a same number of bits, information of bits corresponding to the same bits of the address data to be converted is rewritten and recorded on said master disc.

4. The apparatus for preparing a master disc according to claim 1 wherein said pre-set conversion rule is to record said address data upon conversion using pre-set key information.

5. The apparatus for preparing a master disc according to claim 4 wherein said pre-set key information has been recorded on said master disc.

6. The apparatus for preparing a master disc according to claim 1 wherein at least one of control information used for reproduction of said digital data, copyright information, and information for decrypting encrypted digital data is recorded in an area in which said address data is converted in accordance with said pre-set conversion rule.

7. The apparatus for preparing a master disc according to claim 1 wherein said pre-format signal generating means records said address data as pre-pits on said master disc.

8. The apparatus for preparing a master disc according to claim 1 wherein said pre-format signal generating means records said address data as embossed marks on said master disc.

9. The apparatus for preparing a master disc according to claim 1 wherein said pre-format signal generating means records said address data by wobbling a groove formed on said master disc.

10. A method for preparing a master disc used for manufacturing a recording medium on which digital data has been recorded in synchronism with pre-recorded address data, said method comprising the steps of:
    generating said address data and designating an area for conversion of said address data based on a pre-set conversion rule;
    comparing the generated address data with address data of the designated area;
    converting at least a portion of said address data based on the pre-set conversion rule when a result of the comparing step verifies the generated address data is contained in the designated area;
    generating pre-format signals for recording on said master disc, said pre-format signals containing said address data; and
    recording information indicating the area for conversion of said address data based on said pre-set conversion rule as the generated pre-format signals on said master disc.

11. The method for preparing a master disc according to claim 10 wherein said pre-set conversion rule is to record said address data in a decrementing order.

12. The method for preparing a master disc according to claim 10 wherein said pre-set conversion rule is that, all of the address data to be converted among the pre-recorded address data is expressed with a same number of bits, information of bits corresponding to the same bits of the address data to be converted is rewritten and recorded.

13. The method for preparing a master disc according to claim 10 wherein said pre-set conversion rule is to record said address data upon conversion using pre-set key information.

14. The method for preparing a master disc according to claim 13 wherein said pre-set key information is recorded on said master disc.

15. The method for preparing a master disc according to claim 10 wherein at least one of control information used for reproduction of said digital data, copyright information, and information for decrypting encrypted digital data is recorded in an area in which said address data is converted in accordance with said pre-set conversion rule.

16. The method for preparing a master disc according to claim 10 wherein said pre-format signal generating means records said address data as pre-pits on said master disc.

17. The method for preparing a master disc according to claim 10 wherein said pre-format signal generating means records said address data as embossed marks on said master disc.

18. The apparatus for preparing a master disc according to claim 10 wherein said pre-format signal generating means records said address data by wobbling a groove formed on said master disc.

* * * * *